Nov. 10, 1964 L. T. JORDAN 3,156,302
ROTOR HUB FOR HELICOPTER
Filed Jan. 27, 1964 3 Sheets-Sheet 1
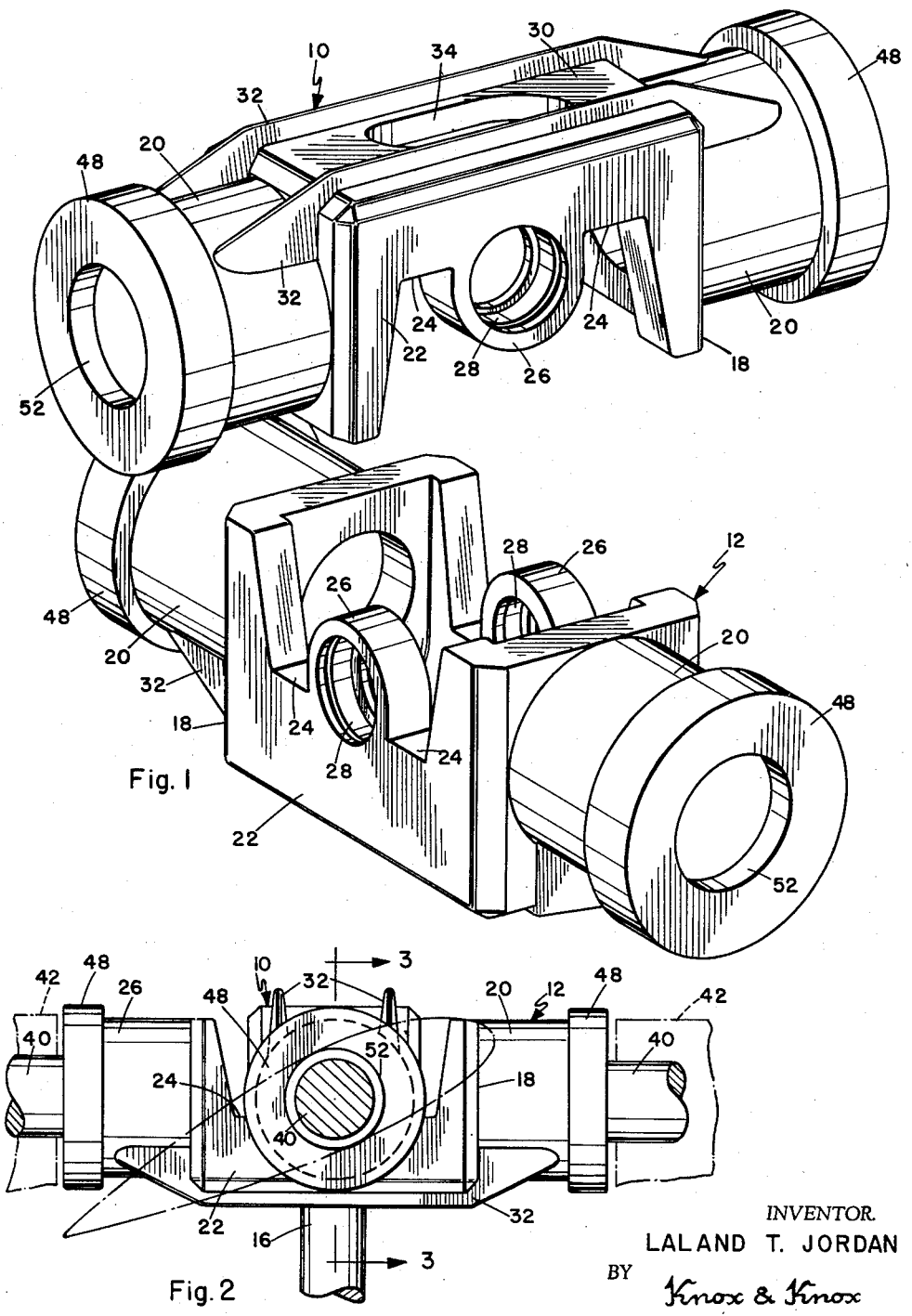
INVENTOR.
LALAND T. JORDAN
BY Knox & Knox Nov. 10, 1964  L. T. JORDAN  3,156,302
ROTOR HUB FOR HELICOPTER
Filed Jan. 27, 1964  3 Sheets-Sheet 2

INVENTOR.
LALAND T. JORDAN
BY
Knox & Knox

United States Patent Office 3,156,302
Patented Nov. 10, 1964

3,156,302
ROTOR HUB FOR HELICOPTER
Laland T. Jordan, 5181 Arlene St., San Diego, Calif.
Filed Jan. 27, 1964, Ser. No. 340,231
3 Claims. (Cl. 170—160.27)

The present invention relates to aircraft and specifically to a rotor hub for a helicopter.

Present helicopter rotor hubs have various types of joints to allow flapping, swinging and other motions of individual rotor blades. When coupled with the blade pitch changing mechanism, the hub structure becomes very complex and expensive, making it impractical to produce a simple, low cost helicopter. On the other hand, the very simple rigid rotor does not have the degree of control necessary for maximium performance in a small helicopter.

The primary object of this invention, therefore, is to provide a helicopter rotor hub of very simple construction, yet incorporating a universal type mounting to permit tilting of the rotor plane with cyclic pitch changes.

Another object of this invention is to provide a rotor hub comprising primarily a pair of identical elements interfitted to form the hub, thus greatly reducing the cost and simplifying assembly.

Another object of this invention is to provide a rotor hub which will carry four rotor blades and is naturally balanced due to its symmetrical structure.

A further object of this invention is to provide a rotor hub which is adaptable to a simple shaft driven arrangement, with any conventional system for blade pitch control.

In the drawings:

FIGURE 1 is a perspective view of the two basic elements of the rotor hub, shown separated but in their relative positions;

FIGURE 2 is a side elevation view of the assembled hub, on a reduced scale;

Similar characters of reference indicate similar or identical elements and portions throughout the specification and throughout the views of the drawings.

*Hub Structure*

Figure 3:
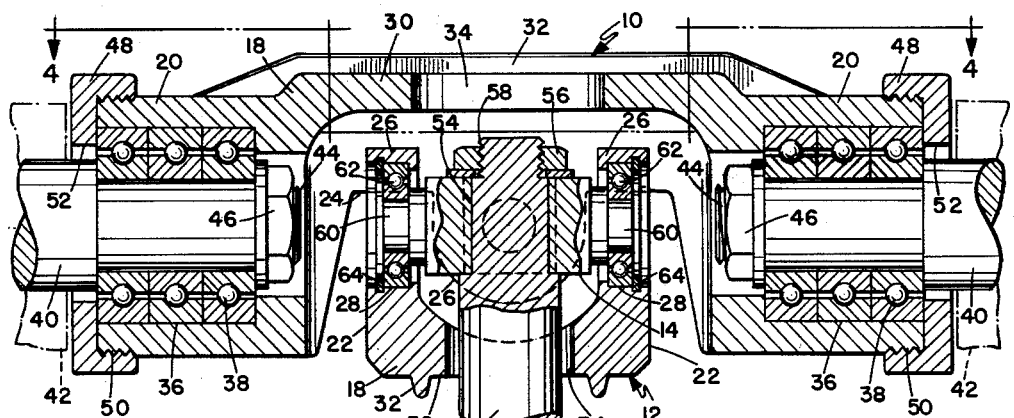
FIGURE 3 is an enlarged sectional view taken on line 3—3 of FIGURE 2.

The rotor hub comprises basically a pair of identical hub elements numbered 10 and 12 for purposes of description, and a mounting spider 14 which is secured to a driven shaft 16. Since both hub elements are identical only one need be described in detail.

Hub element 10 has a central hollow box portion 18 of generally rectangular form, with a pair of coaxial sleeves 20 extending from opposite ends thereof. The opposed side walls 22 of box portion 18 have deep cut outs 24 extending beyond the longitudinal axis of sleeves 20, or more than half way into the walls. Within cut outs 24 and constituting integral portions of side walls 22 are opposed trunnions 26 having coaxial cylindrical bores 28 disposed on an axis perpendicular to and coplanar with the axis of sleeves 20. The side of box portion 18 between the open ends of cut outs 24 is completely open, the opposite, closed base side 30 having externally raised reinforcing ribs 32 extending along sleeves 20 and providing the necessary strength in the structure. Closed base side 30 has a slot 34 wide enough to clear driven shaft 16 and elongated along the axis of sleeves 20. The entire hub element may be a unitary casting suitably machined where necessary, the specific configuration and reinforcement being dependent on the size and strength requirements.

The sleeves 20 have cylindrical bores 36 in which are bearings 38 of any suitable type to carry the stub shafts 40 of rotor blades 42, which are indicated in broken line. Stub shafts 40 may have threaded ends 44 and be held in place by nuts 46, or by any other retaining means depending on the particular blade design. The bearings 38 are retained by end caps 48 screwed on the threaded ends 50 of sleeves 20, said end caps having central openings 52 through which the stub shafts 40 emerge. Any suitable locking means can be used to prevent end caps 48 from unscrewing in use.

The spider 14 is mounted on the splined end 54 of driven shaft 16 and is retained by a nut 56 on a threaded extension 58 of the shaft. The spider has four outwardly extending bosses 60 arranged in opposed pairs on perpendicular axes orthogonal with the axis of driven shaft 16.

Figure 4:
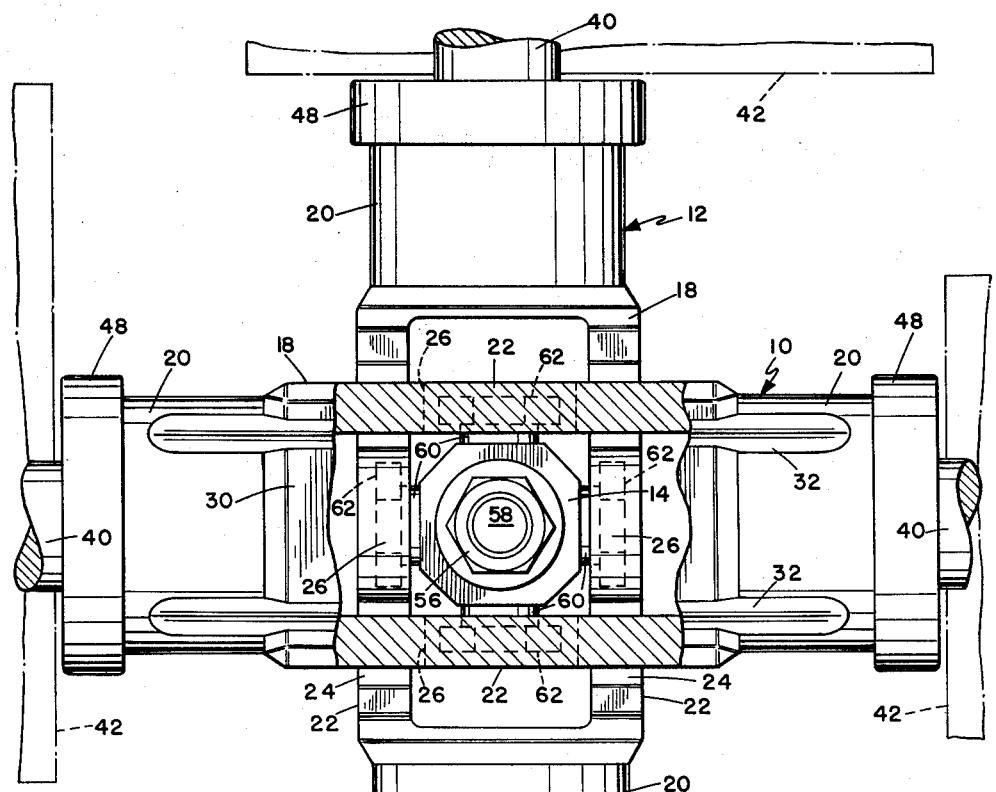
FIGURE 4 is a sectional view taken on line 4—4 of FIGURE 3.

In the assembled rotor hub, illustrated in FIGURES 2-4, the hub element 10 is inverted and placed transversely over hub element 12, the trunnions 26 of element 10 fitting down into the open box portion of element 12 and being coaxial with the axis of sleeves 20 of element 12. Similarly the trunnions 26 of hub element 12 are coaxial with sleeves 20 of hub element 10. Driven shaft 16 extends downwardly through the slot 34 of hub element 12, the spider 14 being positioned between the trunnions 26 and the bosses 60 held in bearings 62 in the bores 28 of said trunnions. Bearings 62 are inserted from the outside of trunnions 26 and secured by snap rings 64, or similar means. Spider 14 thus provides a universal type of joint on which the two hub elements are independently pivotal. With the axes of the trunnions all coplanar, in the neutral position, the hub assembly is well balanced and stable in operation.

*Rotor Arrangement*

Figure 5:
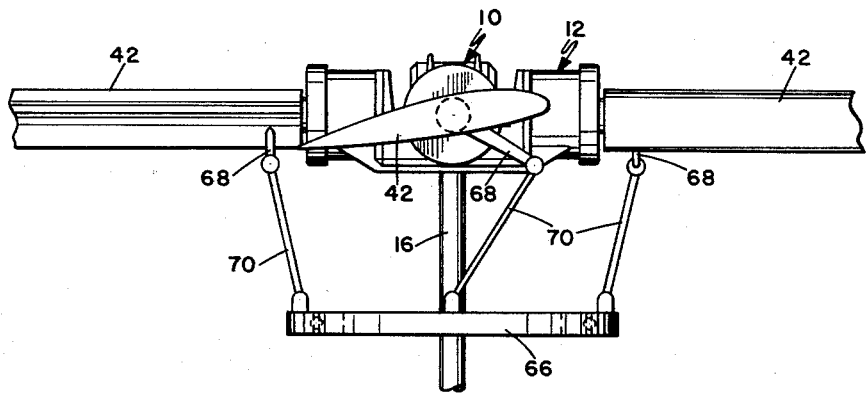
FIGURE 5 is a diagrammatic view of a rotor asesmbly.
Figure 6:
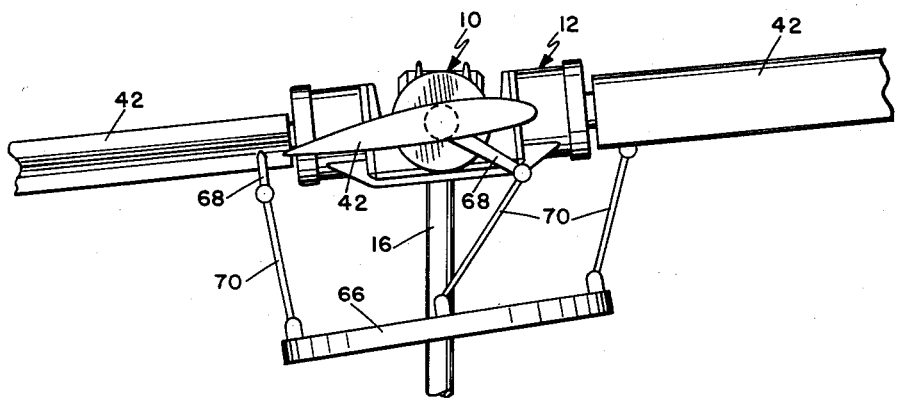
FIGURE 6 is a similar view with the rotor inclined.

A typical rotor arrangement is illustrated in FIGURES 5 and 6, wherein the pitch angle variation of the blades 42 is controlled by a swash plate 66 substantially concentric with driven shaft 16. Each blade 42 has an extended arm 68 pivotally connected to swash plate 66 by a control rod 70. This type of structure is well known in the helicopter art and can vary considerably, that shown being an example of a simple system.

In neutral position, as in FIGURE 5, the rotor plane and the plane of swash plate 66 are perpendicular to shaft 16 and all blades 42 are at equal pitch angles. When swash plate 66 is inclined in a selected direction, as in FIGURE 6, the control rods 70 will move blades 42 to different pitch angles, the resultant unsymmetrical thrust causing the plane of the rotor to tilt also, the resultant thrust offset to the axis of shaft 16 providing directional propulsion. The cyclic pitch action and operation of the system are well known and need not be described in detail.

It will be evident that the simple hub, utilizing a pair of identical elements mounted on a spider, will accommodate all normal rotor plane motion of a helicopter. The structure is simple to manufacture and assemble at minimum cost and is adaptable to various blade types and actuating mechanisms.

It is understood that minor variation from the form of the invention disclosed herein may be made without departure from the spirit and scope of the invention, and that the specification and drawings are to be considered as merely illustrative rather than limiting.

I claim:
1. A helicopter rotor hub, comprising:
a pair of similar hub elements each having coaxial bearing portions at opposite ends thereof to receive and retain rotor blades;
the central portion of each hub element having a pair of spaced trunnions on an axis perpendicular to and coplanar with the axis of said bearing portions;
a rotor supporting shaft having a spider fixed thereon;
said spider having two pairs of stub shafts disposed on orthogonal axes in a common plane;
said hub elements being interfitted and mounted on said spider with said stub shafts journalled in said trunnions.

2. A helicopter rotor hub, comprising:
a pair of similar hub elements each having a central box portion;
a pair of coaxial bearing sleeves extending from opposite ends of said box portion to receive and retain rotor blades;
said box portion having opposed side walls, a substantially closed base side and an open side;
said side walls having trunnions on an axis perpendicular to and coplanar with the axis of said bearing sleeves;
said side walls having cut out portions extending from said open side on opposite sides of said trunnions;
a rotor supporting shaft having fixed thereon a spider with pairs of stub shafts disposed orthogonally on a common plane;
one of said hub elements being inverted and interfitted with the other, with said stub shafts journalled in said trunnions.

3. A rotor hub according to claim 2, wherein the base side of each hub element has a slot elongated along the axis of said bearing sleeves to clear said supporting shaft when the hub element is inclined relative to the shaft.

References Cited by the Examiner
UNITED STATES PATENTS

| | | | |
|---|---|---|---|
| 2,002,287 | 5/35 | Flettner | 170—160.56 |
| 2,481,748 | 9/49 | Hiller | 170—135.26 |
| 2,663,374 | 12/53 | Vandermeer | 170—160.26 |
| 2,724,446 | 11/55 | Hill | 170—160.26 |
| 2,830,669 | 4/58 | Klockner | 170—160.42 |

JULIUS E. WEST, *Primary Examiner.*